United States Patent

[11] 3,619,569

[72] Inventors Jacob George Hoehn
North Palm Beach;
Ronald Alfred Mancini, Palm Beach Gardens, both of Fla.

[21] Appl. No. 55,171
[22] Filed July 15, 1970
[45] Patented Nov. 9, 1971
[73] Assignee RCA Corporation

[54] OPTICAL CARD-READING APPARATUS
6 Claims, 5 Drawing Figs.

[52] U.S. Cl. .......... 235/61.11 E, 250/219 DQ, 235/61.6 E, 340/146.3 AG
[51] Int. Cl. .......... G06k 7/10, G06k 5/00, G01n 21/48, G06k 9/02
[50] Field of Search .......... 250/219, 219 DC, 219 CR; 235/61.11 F, 61.11 E, 61.6 E, 61.7 B, 61.11 R; 340/146.3, 146.3 AG, 146.3 C; 35/48

[56] References Cited

UNITED STATES PATENTS

| | | | |
|---|---|---|---|
| 3,201,569 | 8/1965 | Conron | 235/61.7 |
| 3,539,778 | 11/1970 | Glorioso | 235/61.11 E |
| 3,159,815 | 12/1964 | Groce | 340/146.3 AG |

*Primary Examiner*—Maynard R. Wilbur
*Assistant Examiner*—Robert M. Kilgore
*Attorney*—H. Christoffersen

ABSTRACT: A mark sense card reader employs dual-threshold circuitry to indicate the presence, absence or inability to determine the presence or absence of marks such as pencil marks on a card. The circuitry includes a light-sensing transducer coupled to first and second differential amplifiers. The first such amplifier produces an indication only when a mark is definitely present. The second such amplifier produces an indication both when a mark is present and when the light level is such that no decision can be made as to whether or not a mark is present. The presence of this last indication concurrently with the absence of the other such indication means that no decision can be reached as to whether or not a mark is present. This situation may occur in cases of a poor erasure, or very light marks and in such cases the circuitry of the present disclosure causes the card to be rejected.

INVENTORS
Ronald A. Mancini and
Jacob G. Hoehn.
BY Raymond E. Smiley
ATTORNEY

INVENTORS
Ronald A. Mancini and
Jacob G. Hoehn
BY
Raymond E. Smiley
ATTORNEY

INVENTORS.
Ronald A. Mancini and
Jacob G. Hoehn.
BY Raymond E. Smiley
ATTORNEY

OPTICAL CARD-READING APPARATUS

BACKGROUND OF THE INVENTION

Many makes of card-reading equipment capable of reading pencil marks on cards are available. The so-called mark sense cards used in conjunction with such equipment are employed, for example, to record utility meter readings, to record test answers, to record inventory transactions and other items where it is undesirable to prepare the more common punched card or magnetic tape.

Certain problems in reading the card exist as some people use a hard pencil and therefore make light marks, others use soft pencil and make dark marks. Erasures are also a problem since a poor erasure may be difficult to distinguish from a light mark.

Prior art equipment for reading mark sense cards have one feature in common—unreliability. They have a single-threshold mark detection circuit. That is, in each location where a mark might be located, the circuit determines that there either is or is not a mark. The circuit is not designed to recognize that some "marks" may be erasures, smudge marks, etc. and that the card should be rejected for operator determination of the presence or absence of a mark.

Further, prior art systems known to applicants'attorney are not self-checking. The transducers and related elements may deteriorate over time so that even if the equipment was capable of properly detecting marks when new, it eventually reaches a point where, if not checked, it will make errors reading a perfectly marked card.

It is an object of the present invention to provide a card reader circuit of improved reliability which overcomes the above-stated deficiencies of prior art equipment.

SUMMARY OF THE INVENTION

Apparatus for reading indicia-bearing record carriers for determining whether an indicium is present or absent and for indicating also when a decision cannot be reached as to whether an indicium is present or not on a carrier. It includes a transducer for producing an analog signal having a value corresponding to the amount of light received from said carrier. The transducer is coupled to two differential amplifier means, one for producing a signal indicative of the presence of an indicium and the other for producing a signal which is ambiguous in the sense that it can mean either that an indicium definitely is present or that a decision cannot be reached as to whether or not an indicium is present. In response to the presence of this last-named signal and the absence of the first-mentioned signal, an output is produced to indicate that a decision cannot be reached as to whether or not an indicium is present.

DETAILED DESCRIPTION

Figure 1:
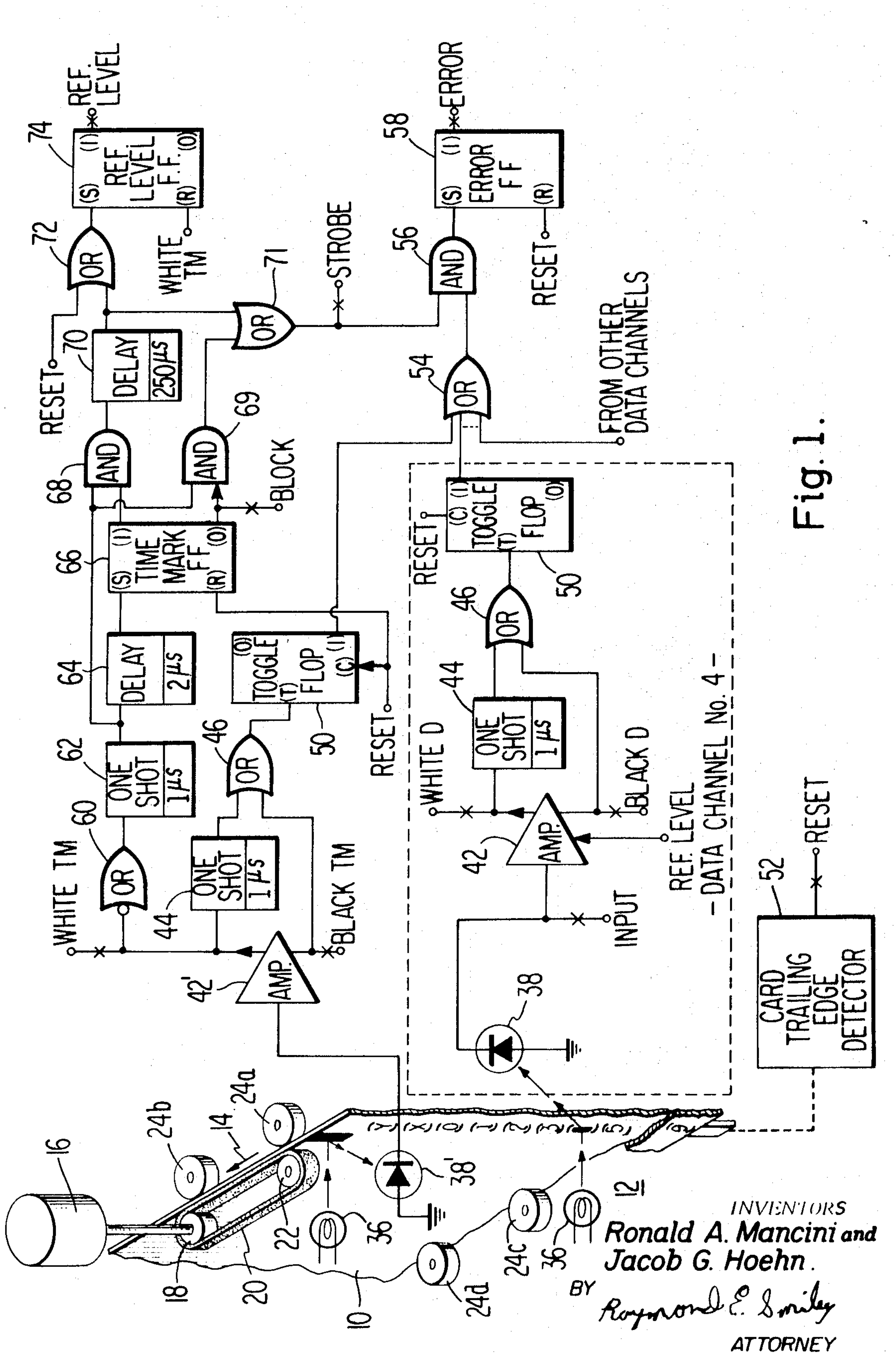
FIG. 1 is a drawing, mostly in block form, showing the logic of the card reader.

In FIG. 1 there is shown a portion of a card reader 12 for transporting a card 10 (only a portion of which is shown) in the direction of arrow 14. A drive motor 16 via drive roller 18, belt 20 and driven roller 22 serves to transport the card. The card is guided by idler rollers 24*a*, *b*,*c*, *d* and other elements not shown. These elements form part of a standard card reader such as the RCA model 70/237, which also has the usual input card holder, card feed and several output pockets to which cards may be directed after they have been read.

Figure 2:
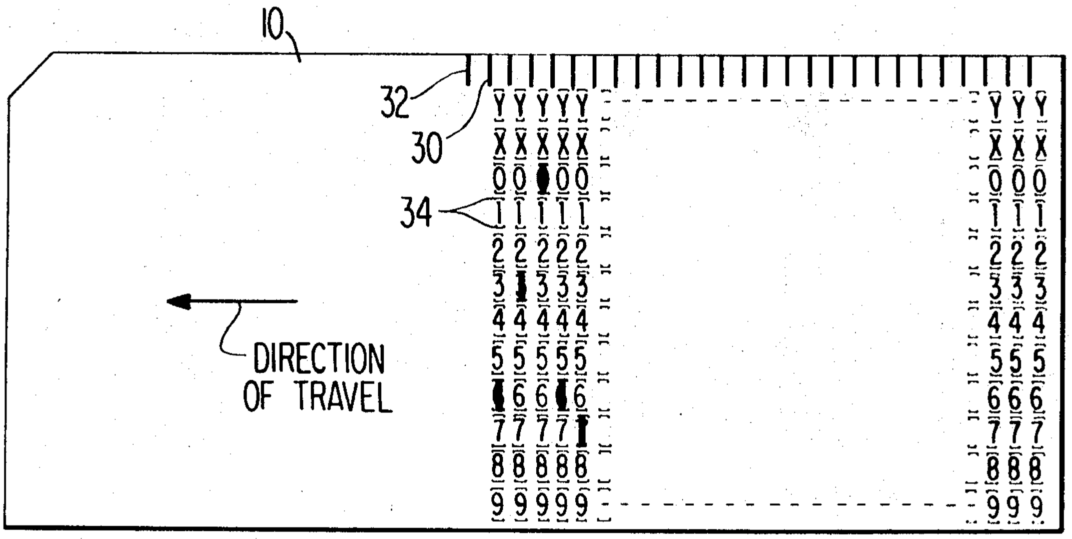
FIG. 2 shows a unit record card suitable for use with the card reader.

Card 10, as shown in FIG. 2, is a standard Holerith size card but may also be larger as for use in answering multiple-answer exams. Card 10 has 27 vertical data columns of 12 horizontal rows labeled Y, X, 0–9. The preprinted numbers and letters are flanked above and below with parentheses like limit marks 34. The letters, numbers and limit marks, while shown in black, will actually be in a color to which the card reader transducer is insensitive. Also the card base color may be cream or any other color that has a substantially different light reflectivity than the black pencil marks.

Along the top of the card, just preceding each data column, is an elongated black mark called a timing mark 30. It should be noted that one extra timing mark called prime mark 32 precedes the first data column timing mark. The operation of the prime mark and timing marks will be explained when the operation of FIG. 1 is described.

The user of the card places pencil marks in the appropriate rows and columns to indicate data to be read by the card reader 12, such as the number 63067 illustrated in FIG. 2.

Returning to FIG. 1, the following are the conventions which are assumed. Signals move from left to right and from top to bottom unless indicated otherwise by an arrow. All logic elements—AND, OR, flip-flop, toggle-flop, one-shot and delay—are enabled by a relatively high voltage signal, also known as a "high" or the "presence" of the signal, and produce highs out of the single output or "one" output (toggle-flop, flip-flop). One-shots are triggered when a low (a relatively low voltage) signal goes high and produces a high output for the time stated. An OR gate with a single open circle at the input is an inverter—a high in produces a low out and vice versa. An "X" on a line indicates that the signal appearing thereon is shown on the timing diagram, FIG. 5.

FIG. 1 shows the circuit for only a single data channel, row 4, and for the timing mark channel. The circuits for the other data channels are similar and therefore are not illustrated separately. Light sources 36 may be provided for each row as shown or alternatively a single light source may serve all rows. There is also a light transducer means such as solar cell 38 for each row to which light is reflected from the card. The output of the solar cell will be at a maximum when opposite a white or light area of the card and at a minimum when opposite a black pencil mark or timing mark on the card.

The signal labeled INPUT from solar cell 38 is coupled to an input amplifier 42 which will be described in more detail later. The amplifier also has an additional input REF. LEVEL, and two outputs WHITE D and BLACK D. The latter two signals are normally present as a result of the solar cell detecting a mark. WHITE D triggers a 1-microsecond one-shot 44 which is coupled as one input of OR-gate 46. BLACK D is coupled directly into the OR gate. The output of OR-gate 46 is coupled to the toggle input of toggle-flop 50. The toggle-flop toggles to an opposite state each time its T-input is enabled. The toggle-flop is cleared [low at the (1) output] at the C-input by RESET. RESET is generated by card-trailing edge detector 52 in response to the detection by it of the trailing edge of the card.

The (1) output of toggle-flop 50 is coupled into OR-gate 54. This OR gate also has coupled into it outputs from the toggle-flops associated with the 11 other data channels and from the timing mark channel as shown. The output of OR-gate 54 and a signal labeled STROBE are the two inputs to AND-gate 56. When the AND gate is enabled, it sets error flip-flop 58 via the S-input. The error flip-flop, when set, produces the signal labeled ERROR which may be used in some way to warn the card reader operator that a reading error has occurred. This may be coupled, for example, to stop the card reader 12, to direct the card into a special output pocket and/or to light a warning light.

The timing mark solar cell 38' is coupled to an input amplifier 42' which will be described in detail later. The outputs from amplifier 42', WHITE TM and BLACK TM are coupled to circuitry similar to that for the data channel described above, like elements having like numbers. In addition, WHITE TM is coupled via an inverter 60 to one-shot 62. This arrangement has the effect of triggering the 1-microsecond one-shot when WHITE TM goes low. The output of one-shot 62 via a 2-microsecond delay 64 is used to set the time mark flip-flop 66. One-shot 62 is also coupled as one input to AND-gate 68, the other input of which is the (1) output of the time mark flip-flop.

Since WHITE TM is generated by the presence of each timing mark including the prime mark 32 (see FIG. 2) the trailing edge of the prime mark delayed by 2 microseconds will set the time mark flip-flop. However, by the time the time mark flip-flop is set, the output of one-shot 62 has gone low. Therefore, AND-gate 68 is not enabled by the prime mark. The trailing edge of every other timing mark will, however, enable AND-gate 68 which after a delay of 250 microseconds in delay means 70 enables OR-gate 72. The high output from OR-gate 72 sets the reference level flip-flop 74.

Drive motor 16 causes the card to move at such speed that the time between the trailing edge of one timing mark and the leading edge of the succeeding timing mark is approximately 450 microseconds. Since the data immediately follows its respective timing mark, a data mark, if present, will occur within 250 microseconds following the trailing edge of the proceeding timing mark. The delay introduced at 70 ensures that the reference level flip-flop will not become set until the data has passed solar cell 38. The reference level flip-flop is reset by the high WHITE TM signal from input amplifier 42'. The (1) output of reference level flip-flop, labeled REF. LEVEL, is used as an input to amplifier 42 in a manner to be described shortly.

The (0) output of the time mark flip-flop, BLOCK, is one of two inputs to AND-gate 69, the second input being an output from one-shot 62. AND-gate 69 is enabled only following the detection of prime mark as manifested by the presence of WHITE TM and prior to the setting of the time mark flip-flop, which causes BLOCK to go low disabling AND-gate 69 for the duration of the card. The enabled AND-gate 69, via OR-gate 71, causes STROBE to be generated as a result of the prime mark. The output of delay means 70 via OR-gate 71 causes STROBE to be generated as a result of each timing mark except the prime mark.

Figure 3:
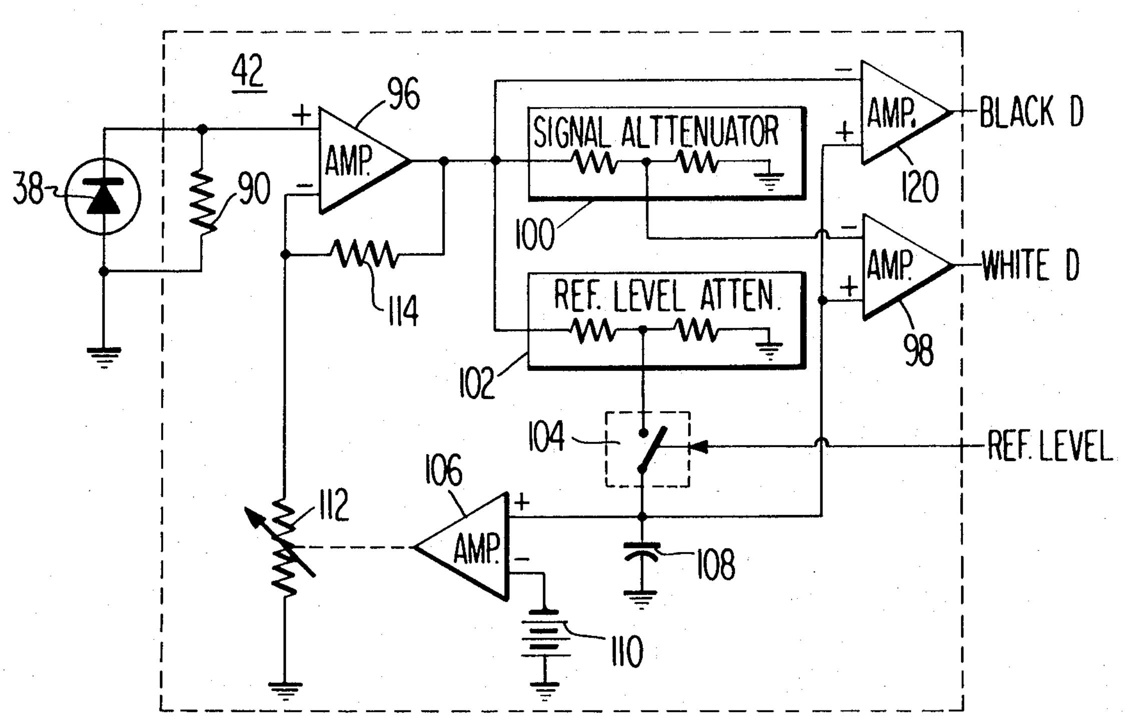
FIG. 3 is a drawing, partially in block form and partially schematic, of one type of transducer amplifier used with the card reader.

Referring to FIG. 3, which shows amplifier 42 in greater detail, it will be noted that the amplifier actually comprises several differential amplifiers and other related elements to be described. Solar cell 38 may be a current-producing device with increasing light received by the solar cell causing an increased current flow. Terminating resistor 90 connected across the solar cell produces a voltage corresponding to the amount of light received by the solar cell, the voltage being approximately linear in a practical application. The combination of solar cell 38 and resistor 90 are DC coupled as one input to a differential amplifier 96. The output of the differential amplifier 96 is coupled to two attenuators, signal attenuator 100 and reference level attenuator 102. The output of attenuator 100 is coupled to a first digital means such as differential amplifier 98. The output of amplifier 96 is also coupled to a second digital means such as differential amplifier 120.

The output of attenuator 102 is coupled via electronic switch 104 as one input to a differential amplifier 106 and to a reference means such as storage capacitor 108. A reference voltage source such as battery 110 is coupled to the other input of amplifier 106. The output of the amplifier is used to control a variable resistor 112 which may be a field effect transistor. A feedback resistor 114, which is connected to the output of amplifier 96 and variable resistor 112 are connected to the second input to the amplifier. Elements 96, 102, 104, 106, 108, 110, 112 and 114 form an automatic gain control circuit.

The gain of amplifier 96 is set whenever REF. LEVEL is present to close switch 104. As was described with reference to FIG 1, and as can be seen from timing chart FIG. 5, REF. LEVEL is present just preceding the prime mark and each timing mark except the first. These are areas on the card where no pencil marks will be present and therefore light from the light background card color will be received by solar cell 38. With switch 104 (FIG. 3) closed, amplifier 106 will adjust the gain of amplifier 96 by adjusting the resistance of variable resistor 112 until the reference level attenuator output 102 just equals the reference voltage from battery 110. During the process of adjusting the gain of amplifier 96, storage capacitor 108 becomes charged to the voltage of battery 110. This capacitor is connected as one input to differential amplifiers 98 and 120 acts as a reference voltage source when data is being read by the solar cell 38.

Operation of the circuit of FIG. 3 is as follows. First the REF. LEVEL signal closes switch 104 to complete the automatic gain control circuit permitting the gain of amplifier 96 to be set. In the process, a reference level voltage is applied to storage capacitor 108. The, as the card is moved past the solar cell array, light is reflected from the card to the solar cell. As a mark (pencil line) moves opposite the solar cell, light reflected into the solar cell and therefore voltage from the solar cell resistor combination diminishes. For example, see data mark 124 FIG. 5. Note that the INPUT signal from the solar cell is driven from some relatively large voltage, minus V, toward zero gradually as the solar cell is influenced more and more by the dark mark. The attenuation of signal attenuator 100 is such that with maximum light reflected into solar cell 38, the output of the signal attenuator 100, which is coupled to amplifier 98 is greater in magnitude than the direct voltage level applied to the second input to amplifier 98 by storage capacitor 108.

However, when the voltage from amplifier 96 diminishes due to a mark passing solar cell 38, the attenuated voltage amplitude decreases to a level lower than that provided by the storage capacitor 108. The result is that amplifier 98 produces a high digital signal WHITE D. The parameters of the signal attenuator are such that the signal WHITE D occurs whenever the reflected light has diminished at least 25 percent, that is, whenever the reflected light is 75 percent or less of its maximum value. As light and thus voltage from amplifier 96 continues to diminish, the voltage from amplifier 96 (that is, the voltage in unattenuated form) becomes lower in magnitude than that of storage capacitor 108. When this occurs, amplifier 120 generates a high BLACK D signal. The parameters of the reference level attenuator are such that BLACK D is generated when the light reflected into solar cell 38 drops 35 percent below the value reflected from the light card background.

Studies have been conducted which show that a light loss of less than 25 percent is consistent with the absence of a mark on the card, that is, when the amount of reflected light is more than 75 percent of its maximum value, one can be fairly certain that no mark is present. A light loss of greater than 35 percent, on the other hand, has been found to be a good indicator of the presence of a mark on the card. The presence of a signal in the range between a 25 percent diminishment of signal and a 35 percent diminishment of signal [indicated when WHITE D is present (high) and BLACK D is absent (low) ] indicates only that it is not possible for the circuit to make an accurate determination of whether or not a mark has been sensed. Such a signal may be caused, for example, by an erasure on the card, by a smudge mark, or by electrical noise in the system. In any event, it has been found that in this range human intervention is required to make the decision.

Figure 5:
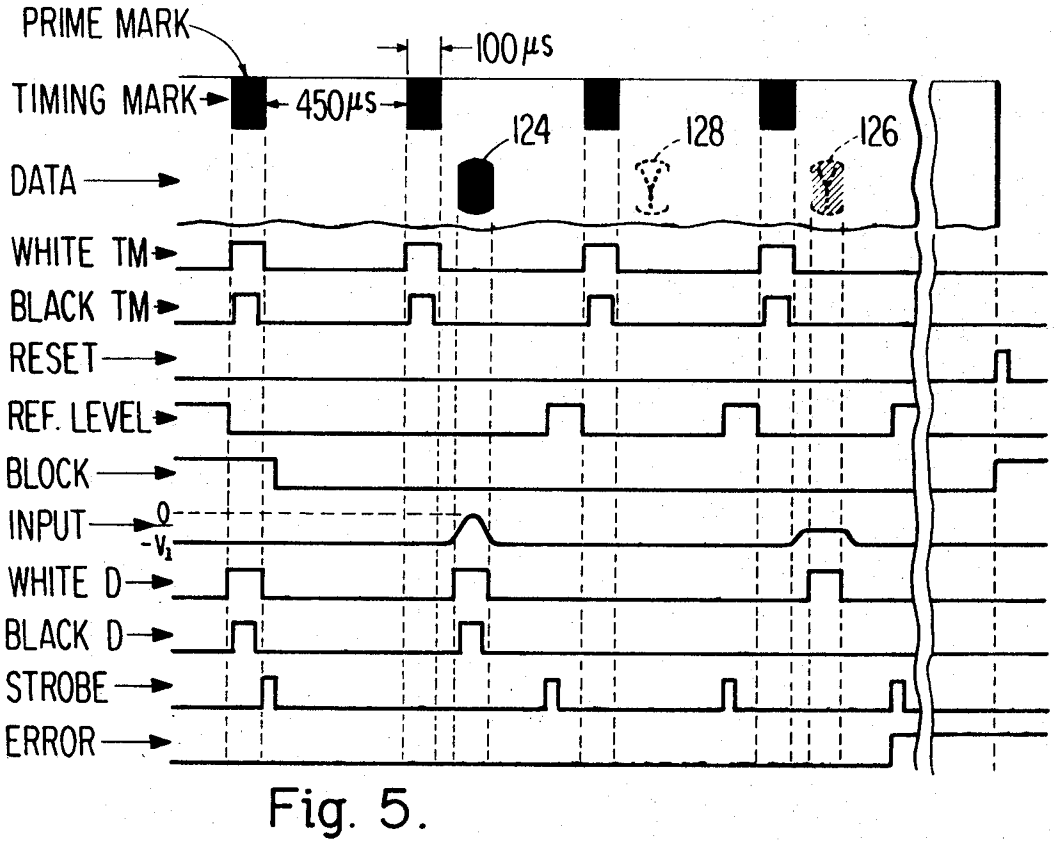
FIG. 5 is a timing diagram of some of the elements of FIG. 1.

An example of such data is data mark 126, FIG. 5, which may, for example, represent either a very light pencil mark or a poor attempt to erase a dark pencil mark. When the INPUT signal drops 25 percent, the WHITE D signal will be generated by amplifier 98. Since it is assumed that the input signal never diminishes more than 35 percent, the BLACK D signal is never generated. The combination of a high WHITE D and low BLACK D is indicative of the fact that the card-reading equipment is incapable of determining whether a mark is or is not present.

A low out of first amplifier 98, a low WHITE D, when data should be present indicates lack of a mark. See, for example, mark location 128, FIG. 5. Incidently, BLACK D will also be low in the absence of a mark.

Figure 4:
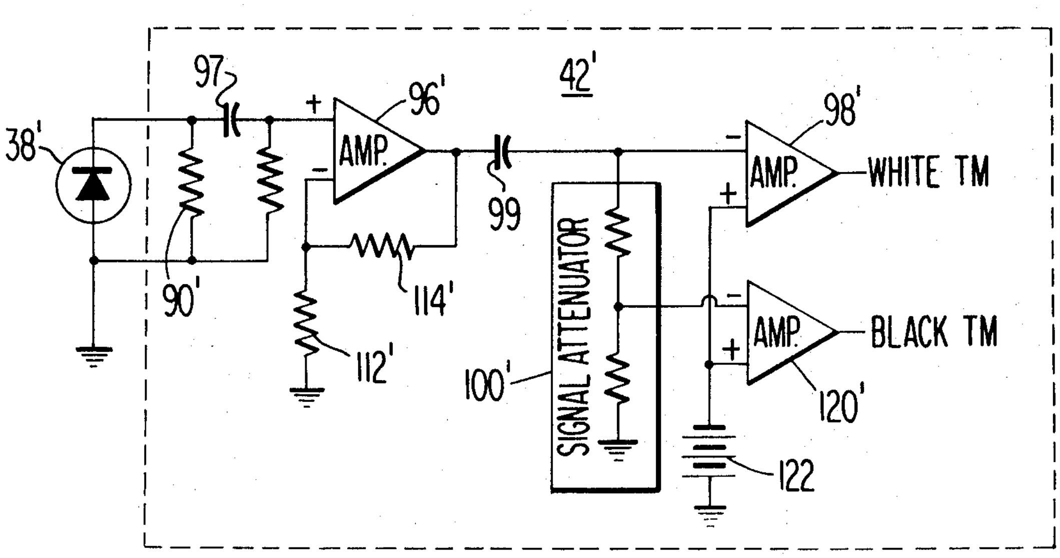
FIG. 4 is a drawing, partially in block form and partially schematic, of a second type of transducer amplifier used with the card reader.

Amplifier 42', shown in FIG. 4, is similar in many respects to amplifier 42. The main differences are that the various differential amplifiers are AC coupled and the automatic gain control circuit is absent. The light source 36' and solar cell 38' form the opto-electronics for the timing mark channel. The solar cell is connected across a terminating resistor 90' and coupled to amplifier 96' through coupling capacitor 97. The grain of amplifier 96' is fixed depending only on the relative values of feedback resistor 114' and resistor 112'. No variable gain is necessary as the black prime mark and timing marks will be substantially darker than the average data mark expected and no erasures will occur. Also because of the darker marks, the change in signal level will be great therefore permitting AC coupling between the various elements of the circuit.

The output of amplifier 96' is AC coupled through capacitor 99 directly to first differential means such as amplifier 98' and through attenuator means 100' to a second differential means such as amplifier 120'. The second inputs to the two differential amplifiers are supplied from a reference means such as battery 122. Because of AC coupling, the input to each amplifier under quiescent conditions is zero. Therefore as the prime mark or a timing mark appears opposite solar cell 38' the diminished voltage of the solar cell terminating resistor combination will appear as an increased voltage into amplifier 96'. As the output voltage of amplifier 96' increases, a voltage increase is manifested at the negative inputs to amplifiers 98' and 120'. The value of reference voltage source 122 is set so that a decrease in signal of 25 percent from the solar cell will cause the input to amplifier 98' to raise to a value equal to that of the reference voltage. When this occurs, the WHITE TM signal will be generated indicating the presence of a mark. The parameters of the signal attenuator are such that when the output from solar cell 38' decreases 35 percent, the BLACK TM signal is generated.

As any one or more of the elements degrade, a point will be reached where the decrease in signal from solar cell 38' will be insufficient to cause the generation of the BLACK TM signal. The absence of the generation of the BLACK TM signal from amplifier 120' indicates that maintenance must be performed on the system. How this error is manifested to the operator will be described as the operation of FIG. 1 is described.

Operation of the apparatus will be described with reference to FIGS. 1 and 5. As the trailing edge of a preceding card is detected, RESET is generated at the card-trailing edge detector 52. RESET via OR-gate 72 sets the reference level flip-flop thereby causing REF. LEVEL to go high. REF. LEVEL is coupled as an input to all data amplifiers 42. By closing switch 104 (FIG. 3) it causes the gain of the input amplifier 96 (FIG. 3) to be adjusted.

As the prime mark on the card approaches solar cell 38' the decreased light output is manifested as a WHITE TM signal from amplifier 42'. WHITE TM resets reference level flip-flop 74 thereby causing the signal REF. LEVEL to go low ending the gain setting of amplifier 42. The WHITE TM signal also triggers one-shot 44 which sends a 1-microsecond pulse to OR-gate 46. The output of OR-gate 46 toggles toggle-flop 50, previously reset by the RESET signal, to the set state [i.e. a high out of the (1) output.] If amplifier 42' and solar cell 38' are functioning properly, the BLACK TM signal will be generated shortly after the WHITE TM signal is generated. Normally, the leading edge of the BLACK TM signal will follow the leading edge of the WHITE TM signal by about 5 microseconds or long after the one-shot 44 has returned to a low condition. BLACK TM via OR-gate 46 will toggle the toggle-flop 50 back to the reset state.

As described previously, if any of the components have degraded, the BLACK TM signal will not be generated and the toggle-flop will remain in the set state. Then, the high (1) output of the toggle-flop 50 will enable OR-gate 54 which provides one of the two signals needed to enable AND-gate 56. A pulse from one-shot 62 generated by the trailing edge of the WHITE TM signal and the high BLOCK signal from the as yet unset time marked flip-flop 66 will enable AND-gate 69. The high output of AND-gate 69 enables OR-gate 71 which in turn produces the STROBE signal. STROBE will enable AND-gate 56 the high output of which sets the error flip-flop 58.

Assuming that the amplifier 42' and solar cell 38' are functioning properly, the trailing edge of the WHITE TM signal via inverter 60, one-shot 62 and delay 64 will set the time mark flip-flop 66 thereby causing the BLOCK signal to go low. A low block signal disables AND-gate 69 so only one STROBE pulse is generated from that gate.

With the time mark flip-flop set, each succeeding trailing edge WHITE TM signal delayed by 250 microseconds in delay 70 will cause the reference level flip-flop to be set generating the signal REF. LEVEL. This signal ensures that the gain of each data amplifier 42 will be set prior to the receiving of each possible data bit at that amplifier.

If the error flip-flop ever becomes set due to questionable data or due to a degraded component in any of the amplifiers or solar cells, the resulting ERROR signal may be used to warn the operator of a malfunction of the equipment. This signal may be used, for example, to light a light or activate an audible warning horn and also to divert a card into a reject output pocket of the card reader.

Although the invention has been described in a mark sense card reader embodiment, it will be appreciated that the invention is not limited thereto. For example, the invention may be embodied in a conventional card reader for reading cards wherein the presence and absence of holes is specified locations represents information. There the intermediate range in the data signal may be caused by a piece of chad (the portion which is normally punched out) partially blocking the hole and therefore reducing the amount of light normally passing through the hole. Also card dust may reduce the effectiveness of the light source or photodiode.

What is claimed is:

1. A system for reading indicia-bearing record carriers for determining whether an indicium is or is not present and for indicating also when a decision cannot be reached as to whether or not an indicium is present on a carrier comprising, in combination:

means for moving said carriers one at a time;

light transducer means positioned adjacent the travel path of said carriers responsive to light received form a portion of a surface of a moving carrier where an indicium may be present for producing an analog signal the value of which is proportional to the amount of light received which value falls within one of three ranges, the first indicative of the absence of an indicium, the third indicative of the presence of an indicium and the second which is between the first and third ranges being indicative of a region of uncertainty in which a decision cannot be reached as to whether or not an indicium is present;

first differential amplifier means coupled to said light transducer means for producing a signal when said light transducer produces a signal in said second or third ranges;

second differential amplifier means also coupled to said transducer means for producing a signal when said light transducer produces a signal in said third range;

digital means coupled to said first and second differential amplifier means responsive to the presence of a signal from said first amplifier means and the absence of signal from second amplifier means for producing a signal to indicate that a decision cannot be reached as to whether an indicium is present on a carrier.

2. The combination of claim 1 wherein the presence of an indicium is manifested by a mark placed on said carrier in response to which said transducer means produces a signal in said third range.

3. In a system for reading marked cards for determining the presence, absence or indeterminateness of said marks on said card comprising, in combination:

light-transducing means for producing an electrical signal indicative of the amount of light reflected from said cards as a portion of said card on which said marks may be located is moved relative to said light-transducing means;

reference means for producing a signal having a value corresponding to a fraction of the value of the electrical signal representative of the absence of a mark;

attenuator means coupled to said light-transducing means for producing an attenuated electrical signal;

first differential amplifier means coupled to said reference means and to said attenuator means for producing a first digital signal when the value of the signal produced by said attenuator means is less in magnitude than the value of said reference signal, the absence of said first digital signal indicative of the absence of a mark;

second differential amplifier means coupled to said light-transducing means and said reference means for producing a second digital signal when the value of said signal produced by said light-transducing means is less in magnitude than said reference signal, the presence of said second digital signal being indicative of the presence of a mark; and digital means coupled to said first and second differential means responsive to the presence of said first digital signal and the absence of said second digital signal for producing a signal indicative of the indeterminateness of the presence or absence of a mark.

4. Apparatus for checking the reliability of opto-electronic means by using a reference standard having a first area of relatively high light reflectivity and a second area of relatively low light reflectivity as said reference standard is moved relative to said opto-electronic means comprising, in combination:

amplifier means coupled to said opto-electronic means for producing a signal having a parameter the value of which corresponds to the amount of light reflected form said reference standard;

reference means for producing a signal having a value greater than the value of signal produced by said amplifier when said opto-electronic means is receiving light from said first area;

first differential digital means coupled to said amplifier and to said reference means for producing a first signal when said signal produced by said amplifier means exceeds said signal from said reference means, said first signal being indicative of the reception of light from said second area of said reference standard by said opto-electronics:

attenuator means coupled to said amplifier for attenuating the signal produced thereby;

second digital means coupled to said attenuator means and said reference means for producing a second signal when the signal produced by said attenuator exceeds the signal from said reference means; and third digital means coupled to said first and second digital means and responsive to the presence of said first signal and the absence of said second signal for producing a signal indicative of the lack of reliability of said opto-electronic means.

5. The combination of claim 2, further including first reference signal generating means coupled as an input to said first differential amplifier set to a value approximately 75 percent of the maximum signal from said transducer with no indicium present which represents the transition between said first and second ranges and second reference signal generating means coupled as a second input to said second differential amplifier means and set to a value approximately 65 percent of the maximum signal from said transducer with no indicium present which represents the transition between said second and third ranges so that said first and second differential amplifier means produce signals when the transducer output drops to approximately 75 percent and 65 percent of maximum value respectively.

6. The combination of claim 1 wherein said record carrier further includes indicators indicating possible indicium locations and further includes gating means coupled between the outputs of said first and second differential amplifiers and said digital means and second transducer means coupled as a second input to said gate for enabling said gate in response to the detection of an indicator by said second transducer.

* * * * *